United States Patent [19]
Stornetta

[11] Patent Number: 5,503,203
[45] Date of Patent: Apr. 2, 1996

[54] ATTACHMENT FOR A PORTABLE ROUTER

[75] Inventor: Ase J. Stornetta, Walnut Creek, Calif.

[73] Assignee: Ritter Manufacturing, Inc., Antioch, Calif.

[21] Appl. No.: 319,196

[22] Filed: Oct. 6, 1994

Related U.S. Application Data

[63] Continuation-in-part of Ser. No. 196,377, Feb. 15, 1994, Pat. No. 5,370,165, which is a continuation-in-part of Ser. No. 46,638, Apr. 14, 1993, Pat. No. 5,311,914.

[51] Int. Cl.$^6$ ............................. B27M 3/00; B26G 19/00
[52] U.S. Cl. ................ 144/372; 144/134 D; 144/252 R; 144/371; 409/137; 409/182; 451/456
[58] Field of Search .................. 15/312.2, 329, 15/330; 409/134, 137, 182; 144/134 R, 134 D, 136 D, 252 R, 252 A, 144 R, 144 S, 371, 372; 451/453, 456

[56] References Cited

U.S. PATENT DOCUMENTS

| | | | |
|---|---|---|---|
| 2,852,051 | 9/1958 | Bickner | 144/136 |
| 2,944,465 | 7/1960 | Jones | 90/11 |
| 3,022,806 | 2/1962 | Johnston | 144/252 |
| 3,167,260 | 1/1965 | Gibbons et al. | 241/56 |
| 3,332,462 | 7/1967 | Williams | 144/251 |
| 3,862,521 | 1/1975 | Isaksson | 51/273 |
| 3,910,327 | 10/1975 | Heckenlaible | 144/136 |
| 3,942,411 | 3/1976 | Gerber | 90/11 A |
| 4,011,792 | 3/1977 | Davis | 90/11 R |
| 4,037,982 | 7/1977 | Clement | 408/61 |
| 4,051,880 | 10/1977 | Hestily | 144/252 |
| 4,409,699 | 10/1983 | Moorhouse | 15/415 |
| 4,606,685 | 8/1986 | Maier et al. | 409/137 |
| 4,613,261 | 9/1986 | Maier et al. | 409/137 |
| 4,738,571 | 4/1988 | Olson et al. | 409/137 |
| 4,742,855 | 5/1988 | Hartley | 144/252 |
| 4,750,536 | 6/1988 | Grisley | 144/251 B |
| 4,821,365 | 4/1989 | Charters | 15/339 |
| 4,822,219 | 4/1989 | Wood et al. | 409/137 |
| 4,930,264 | 6/1990 | Huang | 51/170 T |
| 4,986,703 | 1/1991 | Hampl et al. | 409/131 |

FOREIGN PATENT DOCUMENTS 658817  10/1951  United Kingdom .................... 144/252

OTHER PUBLICATIONS

Unique Solid Door Systems—Model 290 Brochure, Unique Mach & Tool Co., Jan. 1993.

Primary Examiner—W. Donald Bray
Attorney, Agent, or Firm—Medlen & Carroll

[57] ABSTRACT

The present invention comprises an attachment for a portable router which includes a raised sub base which attaches to the base plate of a router. A dust hood slides over the motor and is coupled to the sub base. The handles of the router are taken off and mounted on to the hood. A top rubber casing slides over the motor and is coupled to the top of the dust hood. A vacuum is coupled to the dust hood for the removal of chips and dust from the work area. The sub base raises the router off the work surface allowing more air volume around the router bit to aid in the quickened removal of dust and chips from the work area into the vacuum. The sub base is circularly designed, with an outer lip, allowing an operator to guide the router on a template. The router motor may be adjusted up or down in a conventional manner to obtain a desired depth of cut, through an aperture of the dust hood.

18 Claims, 4 Drawing Sheets

ATTACHMENT FOR A PORTABLE ROUTER

RELATED APPLICATIONS

This application is a continuation-in-part of application Ser. No. 08/196,377 filed on Feb. 15, 1994, now U.S. Pat. No. 5,370,165 which is a continuation-in-part of application Ser. No. 08/046,638 filed on Apr. 14, 1993, now U.S. Pat. No. 5,311,914.

FIELD OF THE INVENTION

This invention relates to the field of portable routers. More particularly this invention relates to the field of attachments for routers to gather dust and chips from the router.

BACKGROUND OF THE INVENTION

A conventional portable router is illustrated in FIG. 1. The router has a motor 10 which attaches to the base 11 of the router. A sub base attaches to the plate 14 of the base of the router. A router bit is attached inside the router base 11 and driven by the router motor 10. The handles 12 are attached to the base 11 and allow an operator to guide the router when in operation.

A router is used to cut grooves into wood for ornamental and decorative purposes in such things as cabinets, doors and furniture. When a conventional portable router is used, a tremendous amount of dust and chips are thrown from the router bit through the opening 15 and into the air. The motor 10 pulls air through it for cooling purposes, this air flow further serves to scatter chips and dust around the work area.

The chips thrown from the router bit can be harmful to the operator, causing cuts and scrapes as well as allergic reactions if the operator is allergic to the type of wood being worked. The Occupational Safety and Health Association (OSHA) has very strict guidelines about this type of activity in the work place.

The OSHA regulations for these types of machines can be found in 29 CFR §1910.212. Specifically in subsection (a) the regulations provide that:

. . . One or more methods of machine guarding shall be provided to protect the operator and other employees in the machine area from hazards such as those created by point of operation, . . . flying chips and sparks.

Thus, in the work place it is now very important that a router is guarded to comply with these OSHA regulations.

A router dust guard was presented by E. F. Johnston in U.S. Pat. No. 3,022,806. This router dust guard is designed to fit over a router that is a single component with the motor and bit both housed in the router housing 16. The guard 18 slides over the router housing 16 and is connected to the lower router flange 13. This guard 18 would not work with the conventional router illustrated in FIG. 1 because it is designed to fit over a router housing having a circular housing and thus would not fit over the motor 10 and the handle acceptors. A conventional router allows the operator to adjust the motor up and down depending on the depth of cut desired. The router dust guard as presented by Johnston would not allow the operator to make those adjustments.

A dust removal attachment for a router was presented by Charters in U.S. Pat. No. 4,821,365. This dust removal attachment has a diamond shaped base plate 12 which connects to a mounting flange 32 having a concave body portion 26. The vacuum attachment 20 is positioned over this concave body portion 26 to remove dust and chips. This invention also uses bristles 30 to surround the aperture 14 and the bit.

Pin routers are well known in the art. Built as a stationary machine, a Pin router has a router bit on an extension arm, positioned above a table. The piece of wood to be cut is slid on the table, under the router bit. Instead of the router bit being moved about the wood as in a conventional portable router, when using a pin router the wood is moved by the operator around the router bit to cut the pattern into the wood.

Computer Numerical Controlled (CNC) Routers are also well known in the prior art. CNC routers will automatically cut a preprogrammed ornamental pattern into a piece of wood of a specified size. These CNC routers are big, expensive and can be slow if more than one size of router bit must be used in the pattern. Because of their size the CNC routers are not portable.

Thus, it would be desirable if a router dust hood could be adapted for a conventional portable router which would allow for cooler motor operation and lower wear on the router motor and bit. It would also be desirable if the router dust hood could be used to eliminate extraordinary heat buildup, reduce fire hazards and eliminate operator injury caused by airborne dust and chips.

SUMMARY OF THE INVENTION

The present invention comprises an attachment for a portable router which includes a raised sub base which attaches to the base plate of a router. A dust hood slides over the motor and is coupled to the sub base. The handles of the router are taken off and mounted on to the hood. A top rubber casing slides over the motor and is coupled to the top of the dust hood. A vacuum is coupled to the dust hood for the removal of chips and dust from the work area. The sub base raises the router off the work surface allowing more air volume around the router bit to aid in the quickened removal of dust and chips from the work area into the vacuum. The sub base is circularly designed, with an outer lip, allowing an operator to guide the router on a template. The router motor may be adjusted up or down in a conventional manner to obtain a desired depth of cut, through an aperture of the dust hood.

The present invention contemplates the attachment to the portable router will be used in a work area in combination with a standard router having a base, a motor and a bit; the attachment comprising a raised circular sub base coupled to the base of the portable router, configured for increasing air volume within the router. The raised circular sub base is configured for cooperatively interacting with a template guide positioned around a piece of wood. The attachment further comprises a means for trapping and removing dust and wood particles from the portable router and the work area, coupled to the router. The removal of chips and dust is enhanced by a natural flow of air through a motor of the router. The means for trapping and removing is comprised of a dust hood positioned around the base of the router. The dust hood includes an aperture through which a height dimension of a motor of the router is adjusted.

The present invention further contemplates a pattern routing system to be used in a work area for cutting ornamental patterns into a piece of wood with a portable router, comprising: a raised sub base coupled to a base of the router, the sub base configured to increase the air volume within the router; and a template positioned around outer edges of a piece of wood for guiding the router around in a pattern, over the piece of wood, the template adapted for cooperatively interacting with the raised sub base. The pattern routing system further comprises a means for trapping and removing dust and wood particles from the portable router and the work area, coupled to the router. The means for trapping and removing is comprised of a dust hood coupled around the base of the router and to the raised sub base. The dust hood includes an aperture through which a height dimension of a motor of the router is adjusted. The pattern routing system further comprises a means for trapping and removing dust and wood particles from the portable router and the work area, coupled to the sub base. The means for trapping and removing is comprised of a dust hood coupled around the base of the router and to the raised sub base. The dust hood includes an aperture through which a height dimension of a motor of the router is adjusted.

The present invention further contemplates a method for cutting a pattern into a piece of wood using a router, the method comprising the steps of: positioning a template around a piece of wood; coupling a raised circular sub base to a base of a router, the raised circular sub base adapted to cooperatively interact with the template; and guiding the router around the template using the raised circular sub base to cut a pattern in the piece of wood. The method also includes the steps of: coupling a means for trapping and removing dust and wood particles to the router; and creating a vacuum inside the means for trapping and removing for removing chips and dust from around a router bit.

The present invention further contemplates an attachment to a portable router which is used in a work area in combination with a standard router having a base, a motor and a bit; the attachment comprising a dust hood coupled to the router for trapping dust and wood particles. The dust hood further includes an extendable hinge for tightening the dust to the router. The attachment further comprises a vacuum source coupled to the dust hood for removing dust and wood particles. The dust hood includes an aperture through which a height dimension of a motor of the router is adjusted.

DESCRIPTION OF THE INVENTION

The present invention includes a router dust hood which will take advantage of the natural air flow of a commercial portable router to direct wood dust and chips trapped by the hood adapter into a vacuum channel and then into a vacuum, removing the dust and chips from the work area and the area inside the base and around the bit. A raised sub base to be used with the router dust hood can replace the sub base of a conventional portable router and can be used to couple the dust hood to the router. Typically, the sub base that is attached to conventional routers has a height dimension equal to ¼ inch. Preferably, the raised sub base of the present invention has a height dimension equal to 1⅛ inch.

The present invention also includes a method of cutting ornamental patterns into doors using the sub base of the router dust hood and a template. By "template", it is meant a frame placed on or around a piece of wood which, when followed using a router will leave a specific ornamental pattern cut into the wood; the present invention contemplates variations (e.g., table saw fences, stencils, etc.) and it is not meant to be limited by the above description. The frame of the template can be made of any type of tubing, metal or other material, of any thickness and shape which will serve to direct the raised sub base of the present invention in the predetermined pattern. The template serves as a guide for the raised sub base of the router dust hood to ride against while the router is being used to cut the pattern into the door.

DETAILED DESCRIPTION OF THE PREFERRED EMBODIMENT

Figure 1:
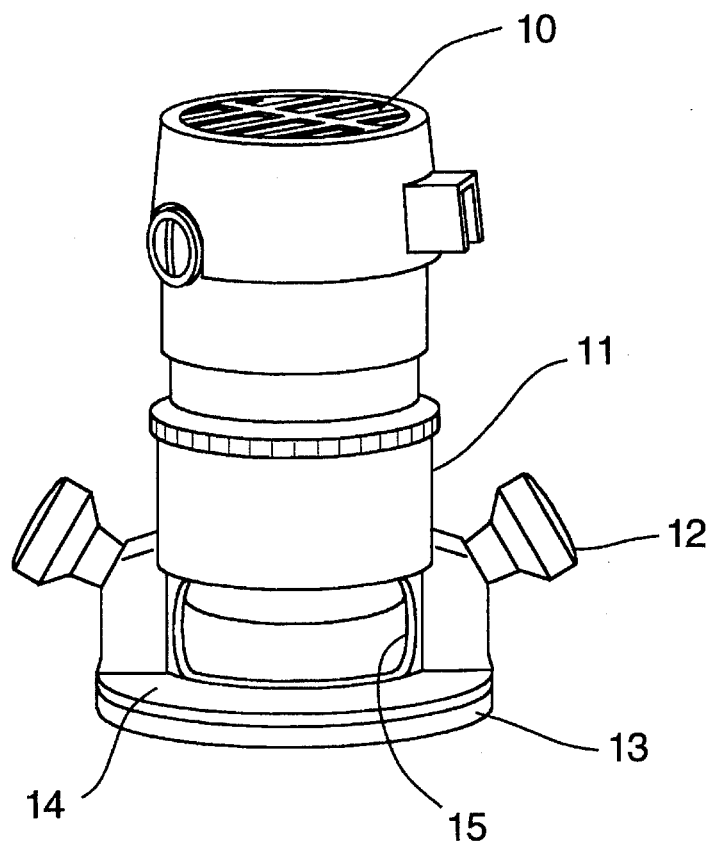
FIG. 1 illustrates a conventional router.
Figure 4:
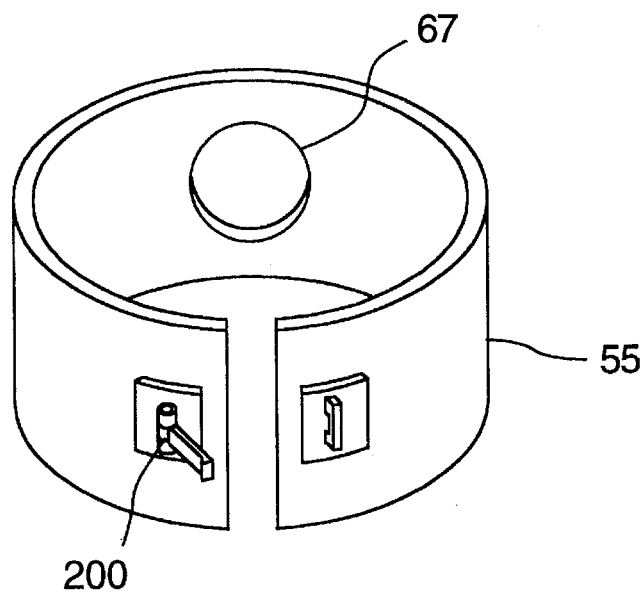
FIG. 4 illustrates an alternate embodiment of the dust hood of the present invention.
Figure 2:
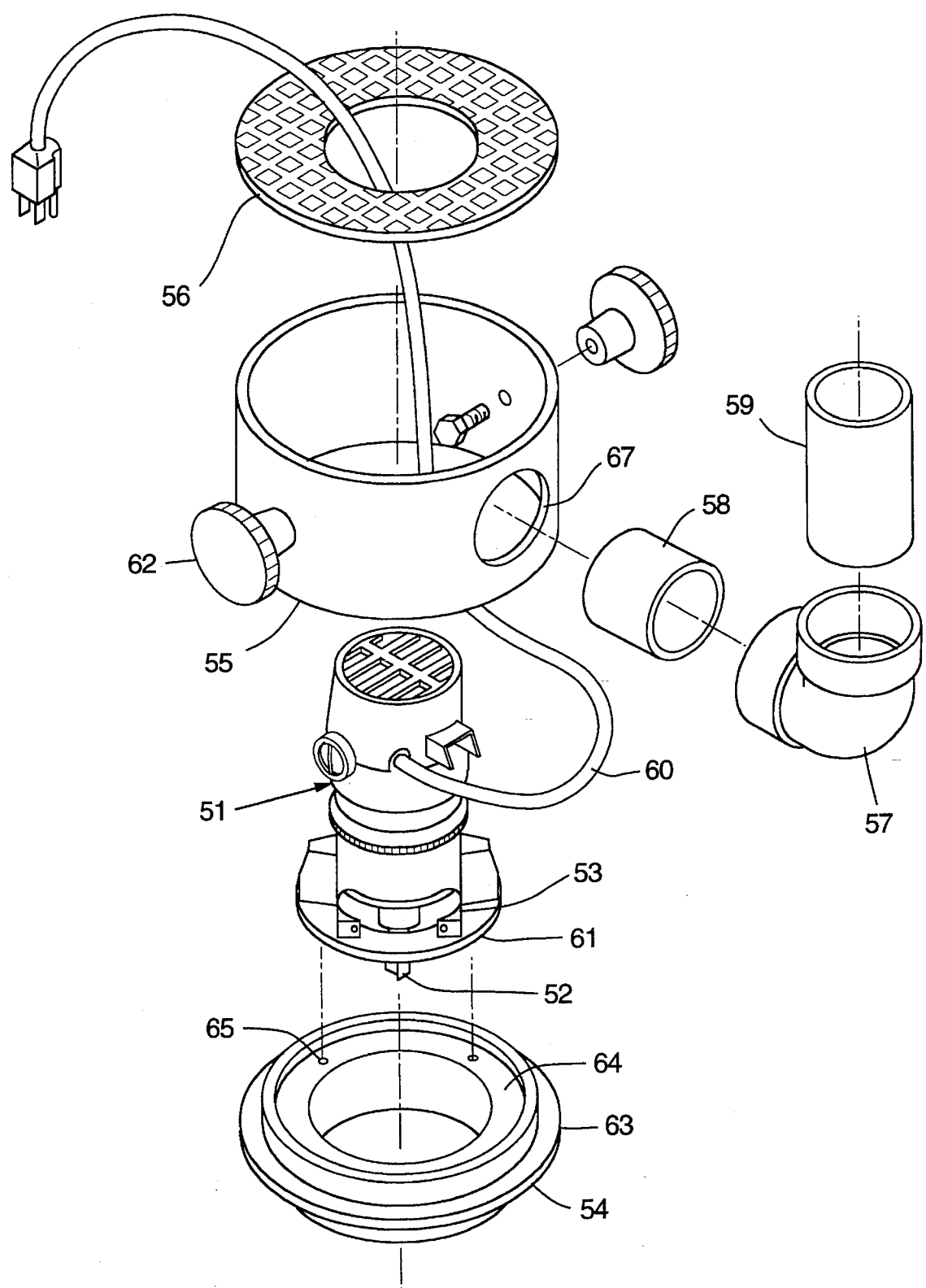
FIG. 2 illustrates the components of the router dust hood of the present invention and how they attach to a conventional router.

The router dust hood of the present invention is illustrated in FIG. 2. A conventional router is shown with a motor 51, a base 53 and a bit 52. The base 53 is positioned around the bit 52 to protect an operator from the rotation of the bit 52 and to aid in the operation of the router. The motor 51 is powered by a connection to an AC source through the power cord 60 and is used to rotate the bit 52.

A raised sub base 54 is coupled to the base plate 61 of the router. The raised sub base 54 has an inner ridge 64 which the base plate 61 of the router fits on and the sub base 54 is secured to the base plate 61 of the router by the screws 65 which extend through the base plate 61 and into the sub base 54. The sub base 54 has an outer lip 63 extending outward from the router at the same height on the sub base 54 as the inner ridge 64. The sub base 54 extends downward from the router below the outer lip 63 so that the router is raised off of the work surface. The raised sub base 54 has a height dimension greater than the height of a conventional router sub base and thereby raises the router up higher above the working surface than a conventional router. Typically, the sub base that is attached to conventional routers has a height dimension equal to ¼ inch. Therefore, the raised sub base of the present invention has a height dimension greater than ¼ inch. In the preferred embodiment, the raised sub base of the present invention has a height dimension equal to 1⅛ inch.

The sub base 54 of the present invention is made out of cast nylon but any other suitable material will do. The height of the sub base can be changed according to the application and the size of the router. The sub base 54 can be made to fit the base plate 61 of any size of portable router. The air volume inside a conventional router around the router bit is 29.58 square inches. The air volume around the router bit using the sub base of the present invention is 118.31 square inches, thus increasing the amount of air volume around the router bit by a factor of three.

The handles 62 are taken off of the router base 53 and secured to the dust hood 55. The dust hood 55 is made to slide over the motor 51, rest on the outer lip 63 and cover the base 53 of the router. The dust hood 55 has an aperture 67 which is used to remove the dust and chips from the work area. The pipe fittings 57, 58, 59 are used to couple the dust hood 55 to the vacuum. The pipe fitting 58 fits into the aperture 67. The elbow pipe fitting 57 fits onto the pipe fitting 58 and the pipe fitting 59 fits into the elbow pipe fitting 57. A vacuum hose is then coupled to the pipe fitting 59. In an alternate embodiment the vacuum hose could be coupled to the dust hood 55 in various other positions, including on the top of the dust hood 55. In a second alternate embodiment, the vacuum hose could be coupled to the sub base of the present invention.

Figure 5:
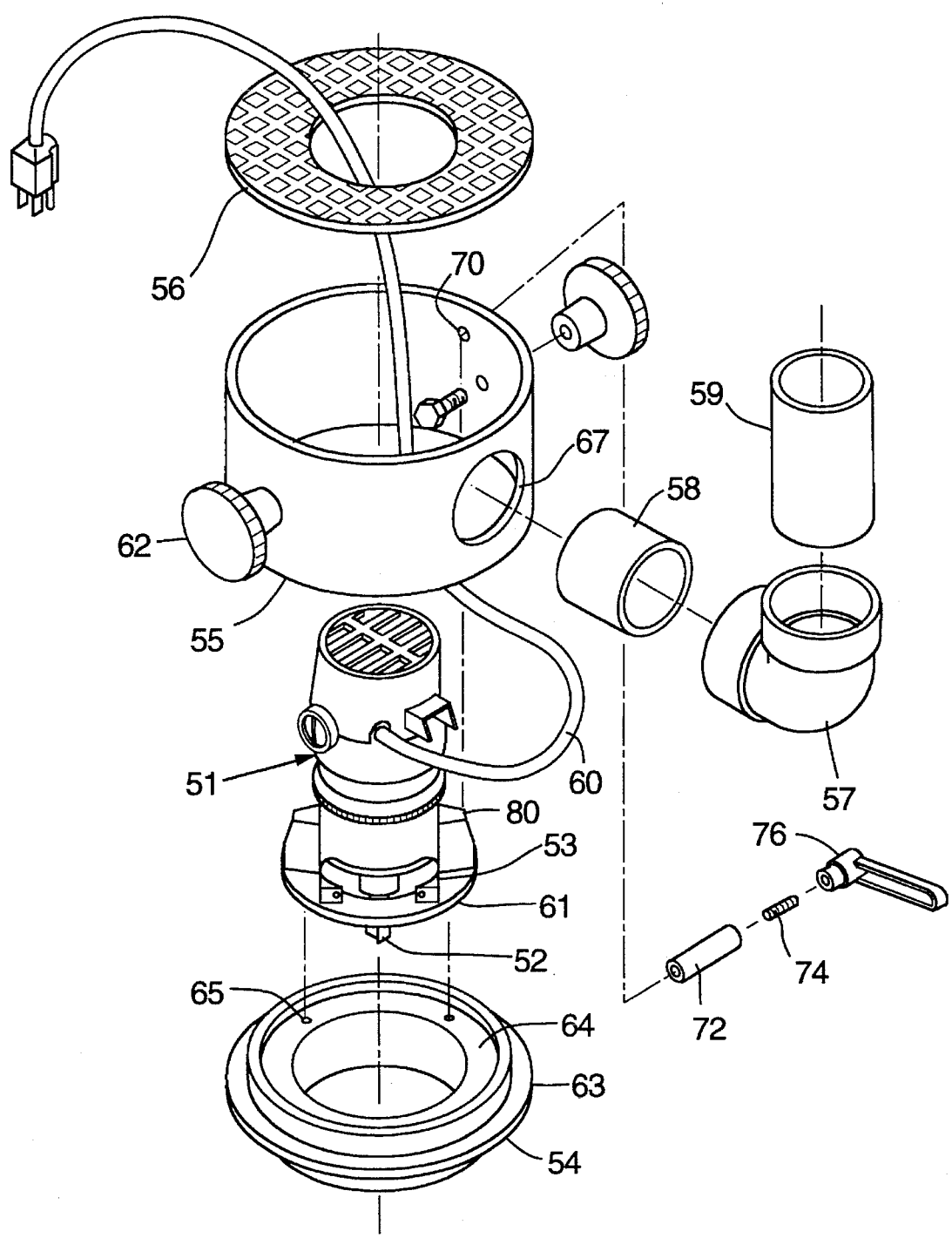
FIG. 5 illustrates a router dust hood including an aperture through which the router motor is adjusted up or down.

FIG. 5 illustrates a dust hood 55 of the present invention which includes an aperture 70 positioned so that the height adjustment screw 80 may be accessed therethrough, in order to raise and lower the router motor to obtain the desired depth of cut. The aperture 70 allows a user to adjust the height of the router motor without removing the dust hood 55. The socket 72, the connector 74 and the handle 76 are used to adjust the height of the router motor by positioning the socket 72 through the aperture 70 to fit over the adjusting screw 80. The connector 74 is then used to couple the socket 72 to the handle 76. The height of the motor is then adjusted by rotating the handle 76 in a conventional manner.

The dust hood 55 of the present invention is made out of a poly-vinyl chloride (P.V.C.) pipe, but any other suitable material can be substituted. It will be apparent to one reasonably skilled in the art that the diameter of the dust hood should be at least as big as the largest diameter of the router. The outer lip of the sub base can have a diameter which is larger than the diameter of the dust hood. A covering of the openings of the router around the bit could also be substituted for the dust hood of the present invention.

In an alternate embodiment of the present invention, the dust hood 55 is slit on the side opposite from the aperture 67. An expandable hinge bracket 200 is coupled to the dust hood 55 on each side of the slit, allowing the dust hood 55 to be expanded to slide over the motor 51 during assembly and removal of the dust hood on a router. In this alternate embodiment the dust hood 55 may also include the aperture 70 as described in detail above.

The top rubber casing 56 slides over the motor 51 and rests on the top of the dust hood 55. The top rubber casing is designed to fit securely around the top of the base 53 of the router, forming a seal. The dust hood 55 is designed so that it rests on the outer lip 63 of the sub base 54 away from the router and the base 53. The top rubber casing 56 covers the dust hood 55 and makes a seal with the top of the base 53 of the router, preventing the dust and chips from escaping out of the top of the dust hood 55

Figure 3:
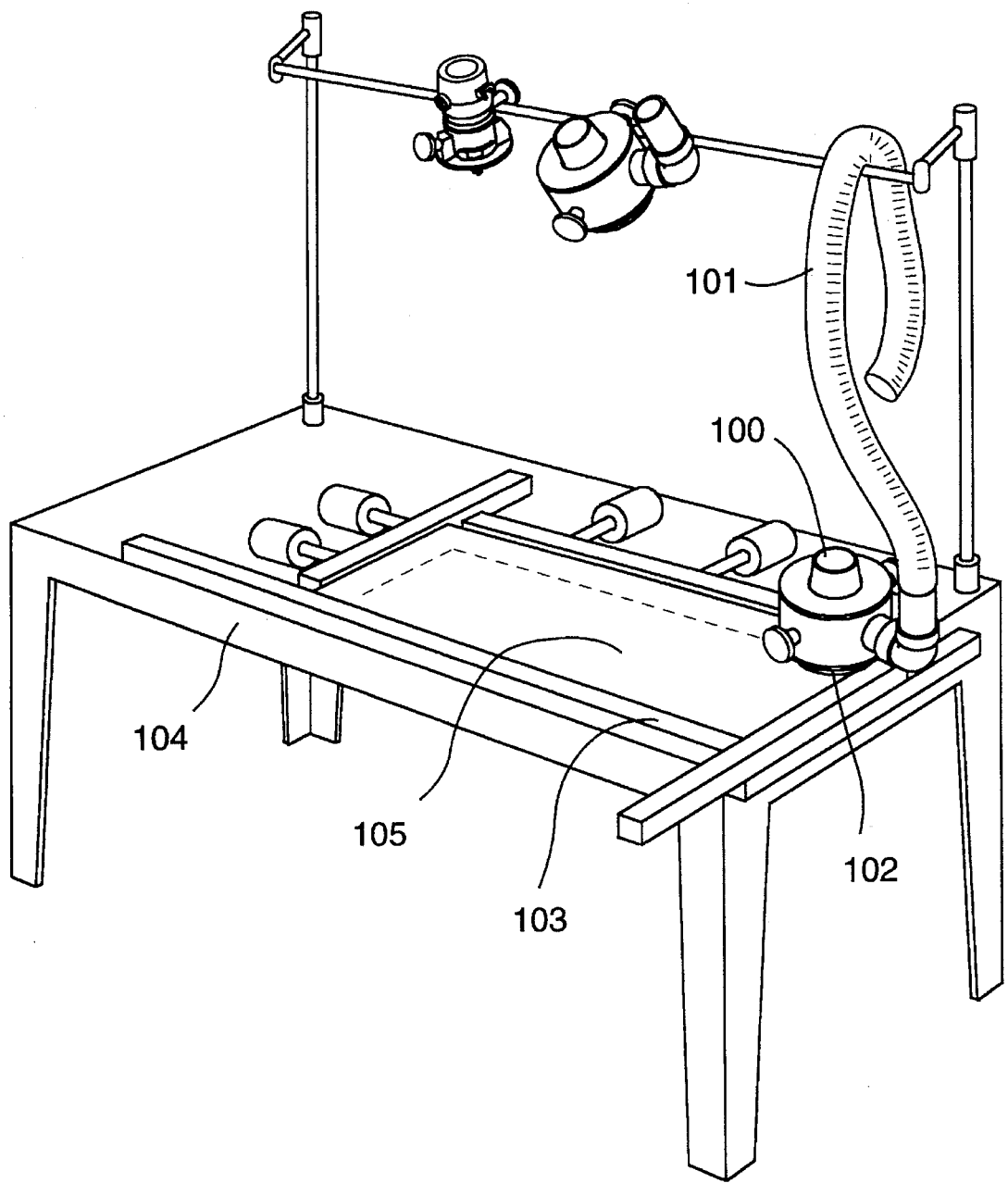
FIG. 3 illustrates a router with a dust hood on a table with a template for a cabinet door.

A router with a dust hood and template are illustrated in FIG. 3. The router 100 is coupled to a raised sub base 102, a dust hood and a vacuum hose 101. A template 103 consisting of square metal tubing is positioned around a cabinet door 105 and is coupled to the table 104. The template 103 is designed so that the raised sub base 102 can be positioned against the template 103 and the pattern can be cut into the cabinet door 105. The router is guided by the operator around the interior edge of the template with the sub base contacting the template.

The raised sub base 102 has a circular design so that it can be rotated around while being operated and as long as the sub base 102 is contacting the template 103, the correct pattern will be cut into the cabinet door 105. The rotation of the router bit and its contact with the wood pulls the router 100 away from the center of the cabinet door, making it easier for the operator to guide the router 100 around the template. The Dust Removal Attachment as disclosed by Charters in U.S. Pat. No. 4,821,365 does not have a circular raised sub base and therefore could not be rotated around while being operated and could not be used with a template.

The motor 51 of the router pulls air through it for cooling purposes. This air flow aids in removing the dust and chips from the work surface. The dust hood 55 is designed to fit on the outer lip 63 of the sub base 54 to maximize the air volume and space around the router bit. The height of the sub base 54 also serves to add additional air volume around the router bit. The amount of air volume added by the dust hood 55 and the raised sub base 54 help move the chips and dust from the work surface to the vacuum faster. Because the chips are moved from the work surface to the vacuum faster, the router bit does not become dull as fast as bits used on conventional routers.

Cooler motor operation and lower wear on the router motor and bit are provided for by the present invention, because there is an enlarged amount of air volume added by the dust hood 55 and the raised sub base 54. The dust hood 55 also serves to eliminate heat buildup around the router and thereby reduces fire hazards in the work place. The dust hood 55 also removes the chance of operator injury caused by airborne dust and chips.

The Router Dust Guard as disclosed by E. F. Johnston in U.S. Pat. No. 3,022,806 does not have a substantive amount of air volume around the router bit. The guard 18 is made to fit tightly over the router housing 16 and the router dust guard has no sub base. The only air volume around the router bit is comprised of the air space in the interior of the router housing.

Improvements and modifications which become apparent to persons of ordinary skill in the art only after reading this disclosure, the drawings and the appended claims are deemed within the spirit and scope of the present invention.

I claim:

1. An attachment to a portable router, the portable router to be used in a work area and having a base, a motor and a bit, the attachment comprising a raised circular sub base coupled to the base of the portable router, the raised sub base configured to raise the router above a work surface and increase air volume around the bit.

2. The attachment as claimed in claim 1 wherein the raised circular sub base is configured for cooperatively interacting with a template guide positioned around a piece of wood.

3. The attachment as claimed in claim 1 further comprising a means for trapping and removing dust and wood particles from the portable router and the work area, coupled to the router.

4. The attachment as claimed in claim 3 wherein the removal of chips and dust is enhanced by a natural flow of air through a motor of the router.

5. The attachment as claimed in claim 3 wherein the means for trapping and removing is comprised of a dust hood, the dust hood positioned around the base of the router.

6. The attachment as claimed in claim 5 wherein the dust hood includes an aperture through which a height dimension of a motor of the router is adjusted.

7. A portable routing system to be used in a work area for cutting ornamental patterns into a piece of wood with a portable router, comprising:
   a. a raised sub base coupled to a base of the router having also a motor and a bit, the sub base configured for raising the router above a work surface and increasing air volume within the router while at the same time, allowing a user to vary a depth of the bit; and
   b. a template positioned around outer edges of a piece of wood for guiding the router around in a pattern, over the piece of wood, the template adapted for cooperatively interacting with the raised sub base.

8. The pattern routing system as claimed in claim 7 further comprising a means for trapping and removing dust and wood particles from the portable router and the work area, coupled to the router.

9. The pattern routing system as claimed in claim 8 wherein the means for trapping and removing is comprised of a dust hood coupled around the base of the router and to the raised sub base.

10. The pattern routing system as claimed in claim 9 wherein the dust hood includes an aperture through which a height dimension of a motor of the router is adjusted.

11. The pattern routing system as claimed in claim 7 further comprising a means for trapping and removing dust and wood particles from the portable router and the work area, coupled to the sub base.

12. The pattern routing system as claimed in claim 11 wherein the means for trapping and removing is comprised of a dust hood coupled around the base of the router and to the raised sub base.

13. The pattern routing system as claimed in claim 12 wherein the dust hood includes an aperture through which a height dimension of a motor of the router is adjusted.

14. A method for cutting a pattern into a piece of wood using a router, the method comprising the steps of:
   a. positioning a template around a piece of wood;
   b. coupling a raised circular sub base to a base of a router having also a motor and a bit, the raised circular sub base for raising the router above a work surface and increasing air volume within the router while at the same time, allowing a user to vary a depth of the bit, the Sub base adapted to cooperatively interact with the template; and
   c. guiding the router around template using the raised circular sub base to cut a pattern in the piece of wood.

15. The method as claimed in claim 14 further comprising the steps of:
   a. coupling a means for trapping and removing dust and wood particles to the router; and
   b. creating a vacuum inside the means for trapping and removing for removing chips and dust from around a router bit.

16. An attachment to a portable router, the portable router to be used in a work area and having a base, a motor and a bit, the attachment comprising a dust hood coupled to the router for trapping dust and wood particles, wherein the dust hood includes an aperture through which a height dimension of the motor is adjusted.

17. The attachment as claimed in claim 16 wherein the dust hood further includes an extendable hinge for tightening the dust to the router.

18. The attachment as claimed in claim 16 further comprising a vacuum source coupled to the dust hood for removing dust and wood particles.

* * * * *